(12) United States Patent
Mizusaki et al.

(10) Patent No.: US 10,686,206 B2
(45) Date of Patent: Jun. 16, 2020

(54) EXHAUST APPARATUS

(71) Applicant: HONDA MOTOR CO., LTD., Minato-Ku, Tokyo (JP)

(72) Inventors: Kimiharu Mizusaki, Wako (JP); Hideharu Naito, Wako (JP); Kosuke Takagi, Wako (JP); Yuki Imamura, Wako (JP); Takaaki Mitsuoka, Wako (JP); Yuki Makari, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 16/255,958

(22) Filed: Jan. 24, 2019

(65) Prior Publication Data
US 2019/0229359 A1 Jul. 25, 2019

(30) Foreign Application Priority Data
Jan. 25, 2018 (JP) ................................ 2018-010731

(51) Int. Cl.
| | | |
|---|---|---|
| H01M 8/2484 | (2016.01) | |
| H01M 8/04082 | (2016.01) | |
| H01M 8/2475 | (2016.01) | |
| H01M 8/0258 | (2016.01) | |
| H01M 8/0662 | (2016.01) | |
| H01M 8/2483 | (2016.01) | |
| H01M 8/1004 | (2016.01) | |
| H01M 8/1018 | (2016.01) | |

(52) U.S. Cl.
CPC ....... *H01M 8/2484* (2016.02); *H01M 8/0258* (2013.01); *H01M 8/04201* (2013.01); *H01M 8/0687* (2013.01); *H01M 8/1004* (2013.01); *H01M 8/2475* (2013.01); *H01M 8/2483* (2016.02); *H01M 2008/1095* (2013.01); *H01M 2250/20* (2013.01)

(58) Field of Classification Search
CPC ............................ H01M 8/0687; B60K 13/04
See application file for complete search history.

(56) References Cited

U.S. PATENT DOCUMENTS

2015/0270562 A1  9/2015  Naito et al.

FOREIGN PATENT DOCUMENTS

| CN | 103566675 A | 2/2014 |
|---|---|---|
| JP | 2003-086209 A | 3/2003 |
| JP | 2007-087718 A | 4/2007 |
| JP | 2012-199171 A | 10/2012 |
| JP | 2014-072096 A | 4/2014 |
| JP | 2015-193370 A | 11/2015 |

OTHER PUBLICATIONS

Office Action dated Sep. 3, 2019 issued over the corresponding Japanese Patent Application No. 2018-010731 with the English translation thereof.

*Primary Examiner* — James Lee
(74) *Attorney, Agent, or Firm* — Carrier Blackman & Associates, P.C.; Joseph P. Carrier; William D. Blackman

(57) ABSTRACT

An exhaust apparatus for discharging exhaust gas from a stack case housing a fuel cell stack includes an exhaust duct in communication with an exhaust port of a vehicle and the stack case and a filter case provided to the exhaust duct and housing a filter. A curved exhaust flow path in which a flow path curves at a plurality of locations is provided in the filter case.

8 Claims, 4 Drawing Sheets

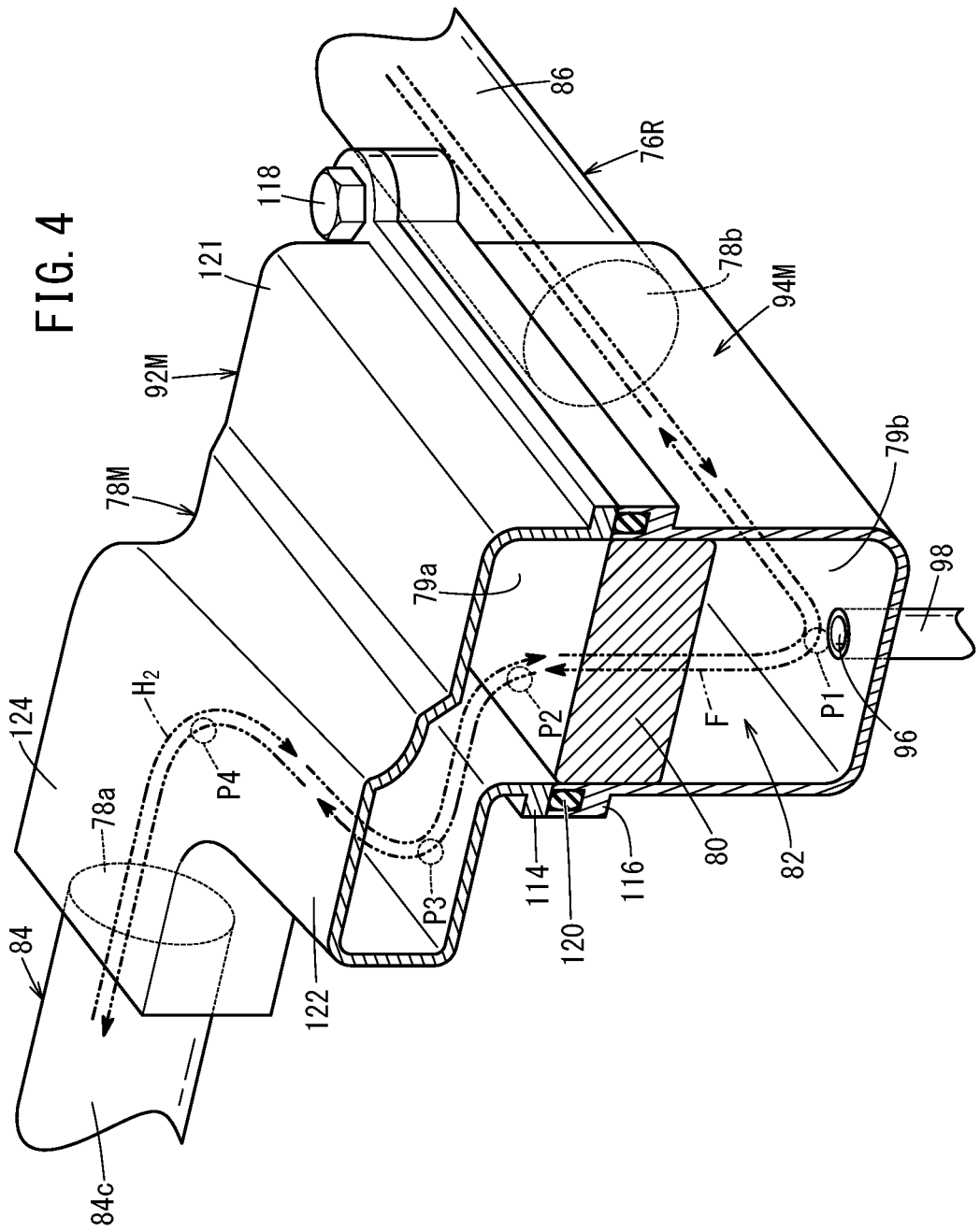

EXHAUST APPARATUS

CROSS-REFERENCE TO RELATED APPLICATION

This application is based upon and claims the benefit of priority from Japanese Patent Application No. 2018-010731 filed on Jan. 25, 2018, the contents of which are incorporated herein by reference.

BACKGROUND OF THE INVENTION

Field of the Invention

The present invention relates to an exhaust apparatus for expelling exhaust gas that contains fuel gas from a stack case housing a fuel cell stack.

Description of the Related Art

As an example, a solid polymer electrolyte fuel cell includes a membrane electrode assembly (MEA) having an anode electrode provided on one side of an electrolyte membrane made from a polymer ion exchange membrane and having a cathode electrode on the other side. The electrolyte membrane assembly is sandwiched by separators, thereby forming a power generation cell. This fuel cell is usually mounted on a fuel cell vehicle as an automotive fuel cell stack, for example, by stacking a prescribed number of power generation cells.

In a fuel cell vehicle, there is a concern that hydrogen that is the fuel gas, in particular, will leak to the inside of the space where the fuel cell stack is mounted. Therefore, Japanese Laid-Open Patent Publication No. 2015-193370, for example, discloses a fuel cell vehicle with the objective of efficiently expelling the hydrogen to the outside when hydrogen leaks from the fuel cell stack. Japanese Laid-Open Patent Publication No. 2015-193370 adopts a configuration in which an exhaust duct is connected to a stack case where the fuel cell stack is housed, and the hydrogen is discharged to the outside of the vehicle from inside the stack case via this exhaust duct.

SUMMARY OF THE INVENTION

The inside of the stack case and the outside of the vehicle are spatially joined via the exhaust duck. Therefore, there is a concern that external water, foreign matter, and the like will enter into the stack case.

The present invention takes into consideration the prior art described above, and it is an object of the present invention to provide an exhaust apparatus that can effectively stop water and foreign matter from intruding into the stack case.

In order to achieve this objective, the present invention is an exhaust apparatus for discharging exhaust gas from a stack case housing a fuel cell stack formed by stacking a plurality of power generating cells, comprising an exhaust duct in communication with an exhaust port of a vehicle and the stack case; and a filter case provided to the exhaust duct and housing a filter, wherein a curved exhaust flow path in which a flow path curves at a plurality of locations is provided in the filter case.

The filter case preferably includes an inlet and an outlet for exhaust gas, and has a shape extending in a horizontal direction, and the inlet and the outlet are preferably provided on one end side of the filter case in a longitudinal direction.

The filter case preferably includes an inlet and an outlet for exhaust gas, the exhaust duct preferably includes a first pipe connected to the stack case and the inlet of the filter case, and a second pipe connected to the outlet of the filter case, and the first pipe or the second pipe is preferably connected in an inclined manner to the filter case.

The filter case preferably includes an upper case and a lower case that is bonded to the upper case.

The filter is preferably attached to the lower case.

The filter is preferably attached to a top portion of the lower case.

A drain pipe extending downward is preferably connected to a floor portion of the lower case.

A drain hole to which the drain pipe is connected is preferably provided in a floor surface of the lower case, facing below the filter.

The filter case preferably includes an inlet and an outlet for exhaust gas, the exhaust duct preferably includes a first pipe connected to the stack case and the inlet of the filter case, and a second pipe connected to the outlet of the filter case, the first pipe is preferably connected to the upper case, and the second pipe is preferably connected to the lower case.

A space within the filter case is preferably divided in a vertical direction by the filter, thereby forming a first chamber and a second chamber.

The fuel cell stack is preferably an automotive fuel cell stack, and the exhaust apparatus is preferably arranged at both sides of the stack case in a vehicle width direction.

According to the exhaust apparatus of the present invention, the curved exhaust flow path in which the flow path curves at a plurality of locations is provided in the filter case provided to the exhaust duct. Therefore, even if water or foreign matter flows in from the exhaust port, the flow of the water or foreign matter to the stack case side is restricted by the curved exhaust flow path within the filter case. Due to this, compared to a case where just the filter is provided to the exhaust duct, it is possible to effectively prevent water and foreign matter from entering in the stack case.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a perspective view for describing a structure of a filter case according to another exemplary configuration.

DESCRIPTION OF THE PREFERRED EMBODIMENTS

Figure 1:
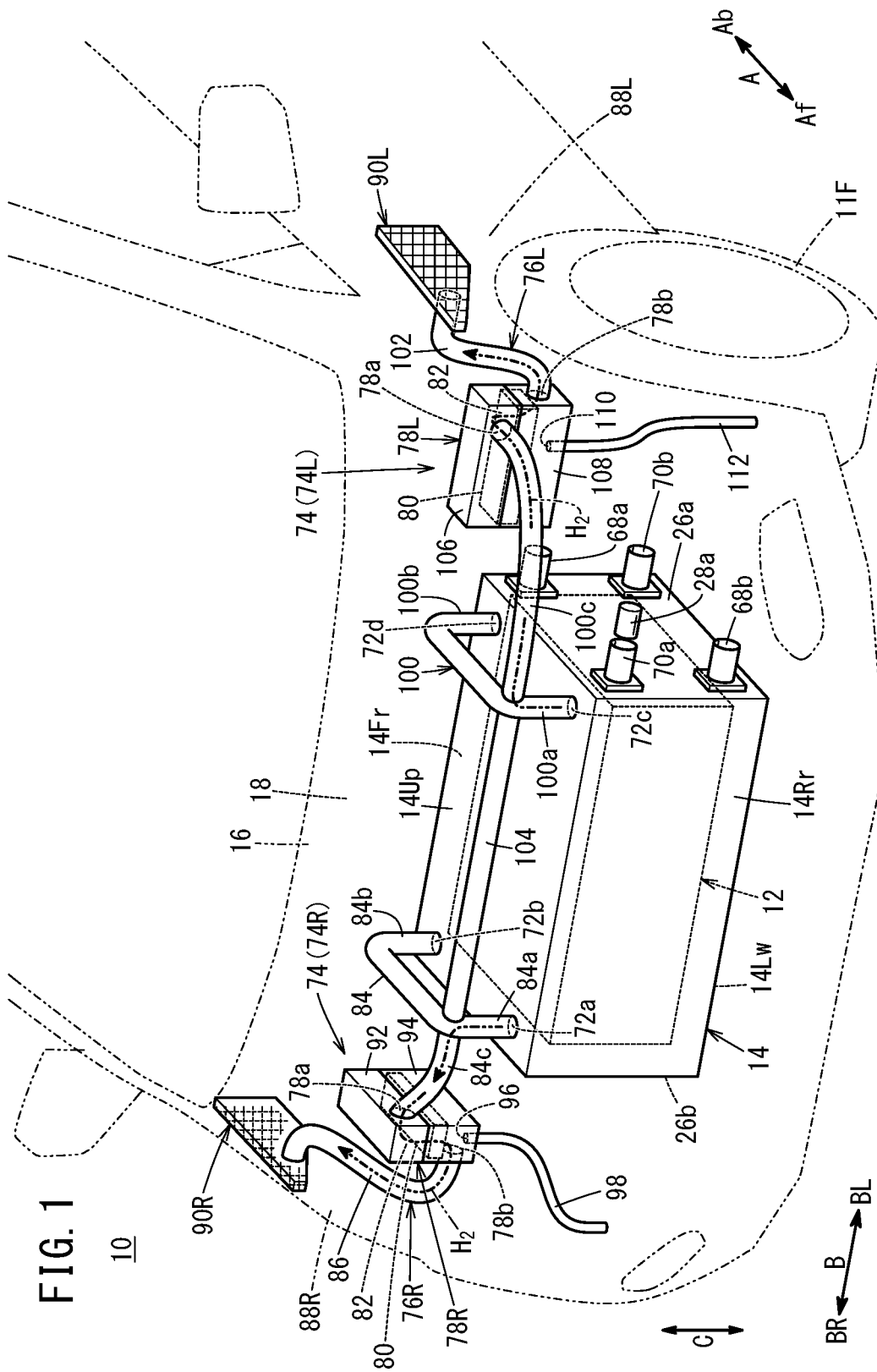
FIG. 1 is a perspective view of a fuel cell vehicle including an exhaust apparatus according to an embodiment of the present invention.

As shown in FIG. 1, a fuel cell vehicle 10 is a fuel cell electric vehicle. In the fuel cell vehicle 10, a stack case 14 housing the fuel cell stack 12 is arranged in a front room (motor room) 18 formed in front of a dashboard 16.

Figure 2:
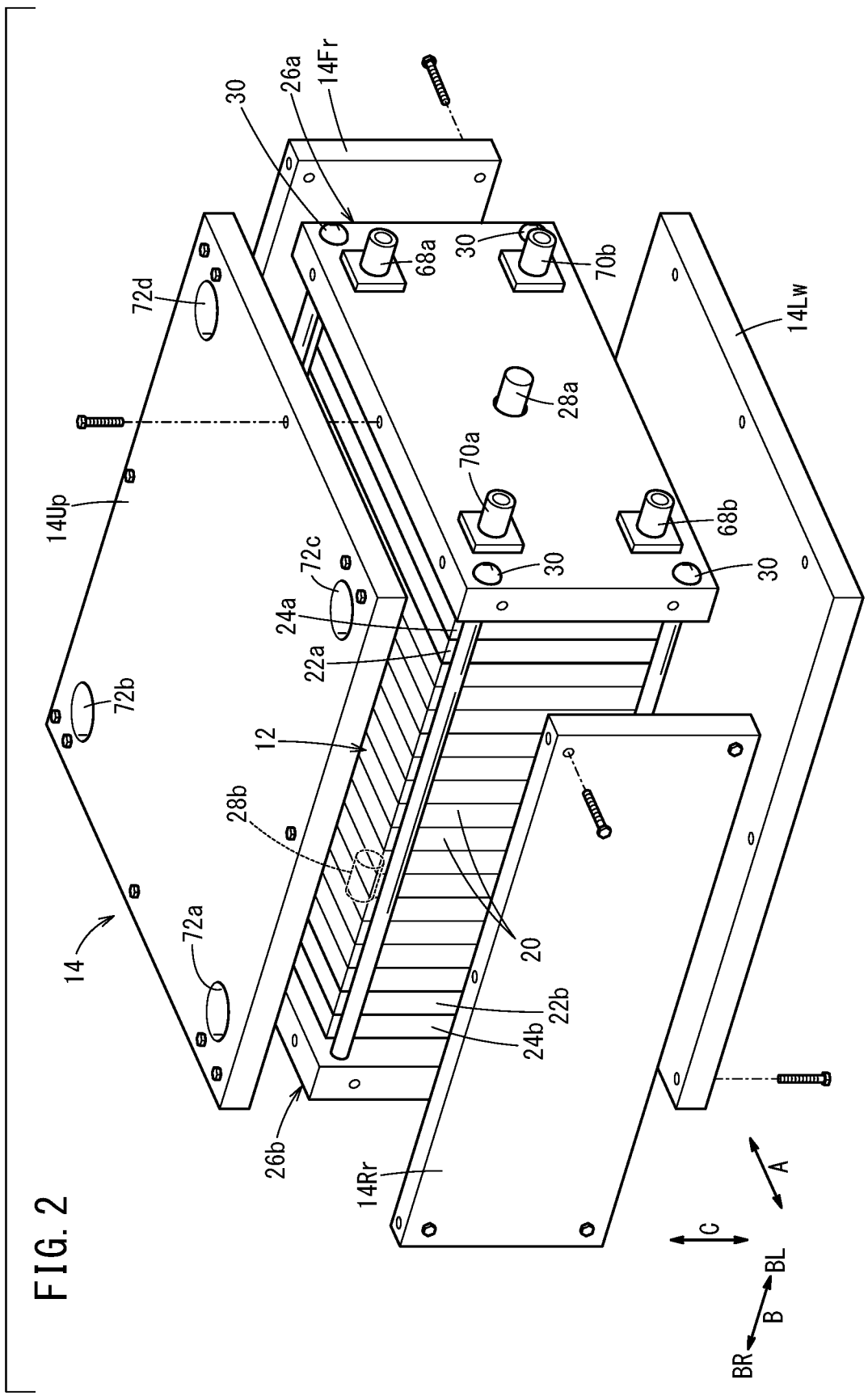
FIG. 2 is an exploded perspective view of a fuel cell stack.

As shown in FIG. 2, the fuel cell stack 12 is formed by a plurality of power generation cells 20 stacked in a vehicle width direction (arrow B direction). A first terminal plate 22a, a first insulating plate 24a, and a first end plate 26a are arranged consecutively in the stated order in an outward direction, at one end of the power generation cells 20 in the stacking direction (on the arrow BL direction side). A second terminal plate 22b, a second insulating plate 24b, and a second end plate 26b are arranged consecutively in the stated order in an outward direction, at the other end of the power generation cells 20 in the stacking direction (on the arrow BR direction side). The first end plate 26a and the second end plate 26b are arranged at respective ends of the fuel cell stack 12 in the vehicle width direction.

The first end plate 26a and the second end plate 26b are set to have contour dimensions greater than the contour dimensions of the power generation cell 20, the first insulating plate 24a, and the second insulating plate 24b. The first terminal plate 22a may be housed in a recessed portion within the first insulating plate 24a, and the second terminal plate 22b may be housed in a recessed portion within the second insulating plate 24b.

A first power output terminal 28a connected to the first terminal plate 22a extends outward from a central portion of the first end plate 26a having a horizontally long shape. A second power output terminal 28b connected to the second terminal plate 22b extends outward from a central portion of the second end plate 26b having a horizontally long shape. Each corner of the first end plate 26a and the second end plate 26b is secured by a tie rod 30 that extends in the stacking direction, and a tightening load is applied in the stacking direction.

Figure 3:
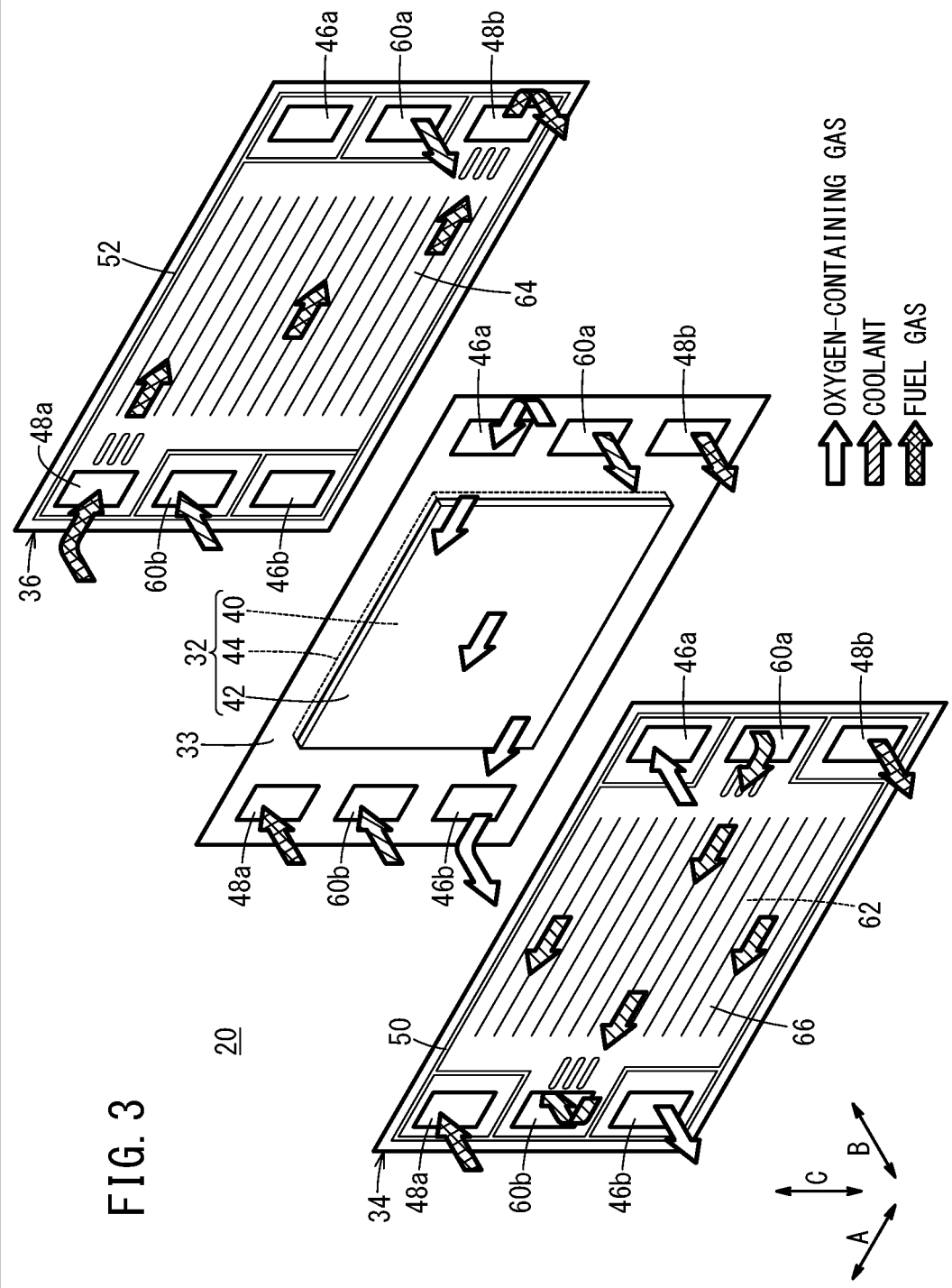
FIG. 3 is an exploded perspective view of a power generation cell.

As shown in FIG. 3, the power generation cell 20 includes a membrane electrode assembly 32 as well as a first separator 34 and second separator 36 that sandwich the membrane electrode assembly 32 from both sides. The membrane electrode assembly 32 includes an electrolyte membrane 40 as well as a cathode electrode 42 and anode electrode 44 that sandwich the electrolyte membrane 40. A film-shaped resin frame member 33 is provided over the entire outer circumference of the membrane electrode assembly 32. The first separator 34 and the second separator 36 are formed by metal separators or carbon separators.

An oxygen-containing gas inlet communication hole 46a, a coolant inlet communication hole 60a, and a fuel gas outlet communication hole 48b are arranged in the arrow C direction (vertical direction) in communication with each other in the stacking direction (arrow B direction) at one end edge portion of the power generation cell 20 in the arrow A direction. The oxygen-containing gas inlet communication hole 46a supplies an oxidizing gas, e.g. an oxygen-containing gas. The coolant inlet communication hole 60a supplies coolant, and the fuel gas outlet communication hole 48b discharges a fuel gas, e.g. a hydrogen-containing gas.

A fuel gas inlet communication hole 48a that supplies the fuel gas, a coolant outlet communication hole 60b that discharges the coolant, and an oxygen-containing gas outlet communication hole 46b that discharges the oxygen-containing gas are arranged in the arrow C direction, in communication with each other in the arrow B direction, at the other end edge portion of the power generation cell 20 in the arrow A direction.

The surface of the first separator 34 facing the membrane electrode assembly 32 is provided with an oxygen-containing gas flow path 62 that is in communication with the oxygen-containing gas inlet communication hole 46a and the oxygen-containing gas outlet communication hole 46b. The surface of the second separator 36 facing the membrane electrode assembly 32 is provided with a fuel gas flow path 64 that is in communication with the fuel gas inlet communication hole 48a and the fuel gas outlet communication hole 48b.

A coolant flow path 66 in communication with the coolant inlet communication hole 60a and the coolant outlet communication hole 60b is provided between the first separator 34 and the second separator 36 that are adjacent to each other and form the power generation cell 20. The first separator 34 and the second separator 36 are respectively provided with seal members 50 and 52 that contact the resin frame member 33 and are provided independently or integrally.

As shown in FIG. 2, an oxygen-containing gas supply manifold 68a in communication with the oxygen-containing gas inlet communication hole 46a and an oxygen-containing gas discharge manifold 68b in communication with the oxygen-containing gas outlet communication hole 46b are provided at one set of diagonal positions in the first end plate 26a. A fuel gas supply manifold 70a in communication with the fuel gas inlet communication hole 48a and a fuel gas discharge manifold 70b in communication with the fuel gas outlet communication hole 48b are provided at the other set of diagonal positions in the first end plate 26a.

The second end plate 26b is provided with an unillustrated coolant supply manifold in communication with the coolant inlet communication hole 60a and an unillustrated coolant discharge manifold in communication with the coolant outlet communication hole 60b.

The fuel cell stack 12 is housed in a stack case 14 with a rectangular shape in the planar view, for example. The stack case 14 includes a front side panel 14Fr, a rear side panel 14Rr, an upper panel 14Up, a lower panel 14Lw, the first end plate 26a, and the second end plate 26b. The components forming the stack case 14 are secured to each other, and also secured to the first end plate 26a and the second end plate 26b. Opening portions 72a, 72b, 72c, and 72d causing the stack case 14 to be in communication with the outside are formed at the four corners of the upper panel 14Up.

As shown in FIG. 1, the fuel cell vehicle 10 includes an exhaust apparatus 74 for discharging exhaust gas from the stack case 14. The exhaust apparatus 74 is arranged on both sides of the stack case 14 in the vehicle width direction. Accordingly, the fuel cell vehicle 10 includes two exhaust apparatuses 74 (74R and 74L).

The right-side exhaust apparatus 74R includes an exhaust duct 76R in communication with the stack case 14 and a right-side exhaust port 90R, and a filter case 78R provided to the exhaust duct 76R and housing a filter 80. A curved exhaust flow path 82 that is a flow path curving at a plurality of locations is provided within the filter case 78R. The right-side exhaust duct 76R includes a first pipe 84 connected to the stack case 14 and a first port 78a (exhaust gas inlet) of the filter case 78R, and a second pipe 86 connected to a second port 78b (exhaust gas outlet) of the filter case 78R.

The first pipe 84 of the right-side exhaust duct 76R is connected to the two opening portions 72a and 72b provided in the right side of the upper panel 14Up. The first pipe 84 includes two connection pipe portions 84a and 84b connected to the two opening portions 72a and 72b, and a junction pipe portion 84c formed by joining the connection pipe portions 84a and 84b and connected to the first port 78a of the filter case 78R. The second pipe 86 of the right-side exhaust duct 76R has one end connected to the second port 78b of the filter case 78R and another end connected to the right-side exhaust port 90R provided in the right-side fender portion 88R. The (junction pipe portion 84c of the) first pipe 84 is connected in an inclined manner to the filter case 78R. In a similar manner as the first pipe 84, the second pipe 86 is connected in an inclined manner to the filter case 78R. Instead, only one of the first pipe 84 and the second pipe 86 may be connected in an inclined manner to the filter case 78R.

The filter case 78R has a shape that extends in the horizontal direction. The filter case 78R is rectangular-shaped in planar view. The longitudinal direction of the filter case 78R is along the vehicle front-rear direction (arrow A direction). The longitudinal direction of the filter case 78R may be along the vehicle width direction (arrow B direction) or may be inclined relative to the vehicle width direction. The filter case 78R may have a shape other than a rectangular shape in the planar view, e.g. a square shape, another polygonal shape, a circular shape, an elliptical shape (not limited to a geometric ellipse), an ovular shape, and the like.

A first port 78a and a second port 78b of the filter case 78R are provided at one end side of the filter case 78R in the longitudinal direction. Accordingly, the first pipe 84 and the second pipe 86 are connected to the one end side of the first case 78R in the longitudinal direction. Instead, one of the first pipe 84 and the second pipe 86 may be connected to the one end side of the filter case 78R in the longitudinal direction, and the other may be connected to the other end side of the filter case 78R in the longitudinal direction.

The filter case 78R includes an upper case 92 and a lower case 94 bonded to the upper case 92. The filter 80 is attached to the lower case 94. The first port 78a is provided to the upper case 92. Accordingly, the first pipe 84 is connected to the upper case 92. The second port 78b is provided to the lower case 94. Accordingly, the second pipe 86 is connected to the lower case 94. Instead, the second pipe 86 may be connected to the upper case 92 and the first pipe 84 may be connected to the lower case 94.

A drain hole 96 is formed in the floor portion of the filter case 78R (floor portion of the lower case 94), and one end of a drain pipe 98 is connected to this drain hole 96. The drain pipe 98 is a pipe for discharging water that has flowed into the filter case 78R to the outside of the vehicle. The other end of the drain pipe 98 is arranged inside a wheel housing that covers the right-side front wheel, for example.

The left-side exhaust apparatus 74L includes an exhaust duct 76L in communication with the stack case 14 and a left-side exhaust port 90L and a filter case 78L provided to the exhaust duct 76L and housing the filter 80. A curved exhaust flow path 82 that is a flow path curving at a plurality of locations is provided within the filter case 78L. The left-side exhaust duct 76L includes a first pipe 100 connected to the stack case 14 and the first port 78a of the filter case 78L, and a second pipe 102 connected to the second port 78b of the filter case 78L.

The first pipe 100 of the left-side exhaust duct 76L is connected to the two opening portions 72c and 72d provided in the left side of the upper panel 14Up. The first pipe 100 includes two connection pipe portions 100a and 100b connected to the two opening portions 72c and 72d, and a junction pipe portion 100c formed by joining the connection pipe portions 100a and 100b and connected to the first port 78a of the filter case 78L. The first pipe 100 of the left-side exhaust duct 76L is in communication with the first pipe 84 of the right-side exhaust duct 76R, via a linking pipe 104.

A second pipe 102 of the left-side exhaust duct 76L has one end connected to the second port 78b of the filter case 78L, and another end connected to the left-side exhaust port 90L provided in the left-side fender portion 88L. The first pipe 100 is connected in an inclined manner to the filter case 78L. In a similar manner as the first pipe 100, the second pipe 102 is connected in an inclined manner to the filter case 78L. Only one of the first pipe 100 and the second pipe 102 may be connected in an inclined manner to the filter case 78L.

The filter case 78L has a shape extending in the horizontal direction. The longitudinal direction of the filter case 78L is along the vehicle width direction (arrow B direction). The longitudinal direction of the filter case 78L may be along the vehicle front-rear direction (arrow A direction), or may be inclined relative to the vehicle front-rear direction. The filter case 78L may have a shape other than a rectangular shape in the planar view, e.g. a square shape, another polygonal shape, a circular shape, an elliptical shape (not limited to a geometric ellipse), an ovular shape, and the like.

The filter case 78L of the left-side exhaust apparatus 74L and the filter case 78R of the right-side exhaust apparatus 74R are arranged having different longitudinal directions. Instead, the filter case 78L of the left-side exhaust apparatus 74L and the filter case 78R of the right-side exhaust apparatus 74R may be arranged having the same longitudinal direction.

The first port 78a and the second port 78b of the filter case 78L are provided at one end side of the filter case 78L in the longitudinal direction. Accordingly, the first pipe 100 and the second pipe 102 are connected to the one end side of the filter case 78L in the longitudinal direction. Instead, one of the first pipe 100 and the second pipe 102 may be connected to the one end side of the filter case 78L in the longitudinal direction, and the other may be connected to the other end side of the filter case 78L in the longitudinal direction.

The filter case 78L includes an upper case 106 and a lower case 108 bonded to the upper case 106. The filter 80 is attached to the lower case 108. The first port 78a is provided to the upper case 106. Accordingly, the first pipe 100 is connected to the upper case 106. The second port 78b is provided to the lower case 108. Accordingly, the second pipe 102 is connected to the lower case 108. Instead, the second pipe 102 may be connected to the upper case 106 and the first pipe 100 may be connected to the lower case 108.

A drain hole 110 is formed in the floor portion of the filter case 78L (floor portion of the lower case 108), and one end of a drain pipe 112 is connected to this drain hole 110. The drain pipe 112 is a pipe for discharging water that has flowed into the filter case 78L to the outside of the vehicle. The other end of the drain pipe 112 is arranged inside a wheel housing that covers the left-side front wheel, for example.

The linking pipe 104 does not need to be included. Only one opening portion (any one of the opening portions 72a and 72b or an opening portion provided at another position) may be provided in the right side of the upper panel 14Up, and only one connecting pipe portion may be provided in the first pipe 100. Only one opening portion (any one of the opening portions 72c and 72d or an opening portion provided at another position) may be provided in the left side of the upper panel 14Up, and only one connecting pipe portion may be provided in the first pipe 100. An auxiliary machine case (e.g. a case housing a fuel gas supply/exhaust system device or an oxygen-containing gas supply/exhaust system device) may be connected adjacent to the stack case 14, and the first pipe 84 or first pipe 100 may be connected to this auxiliary machine case.

Instead of the filter cases 78R and 78L, a filter case 78M having the configuration shown in FIG. 4 may be used.

In FIG. 4, a flange portion 114 provided over the entire outer circumferential surface of the bottom portion of the upper case 92M and a flange portion 116 provided over the entire outer circumferential surface of the top portion of the lower case 94M are secured to each other by a bolt 118 (fastening component). A seal member 120 made from an elastic material is arranged over the entire circumference between the two flange portions 114 and 116. The upper case 92M includes a base portion 121 covering the upper opening portion of the lower case 94M, a projecting portion 122 projecting farther from the base portion 121 in the horizontal direction than the lower case 94, and a protruding portion 124 that partially protrudes from the projecting portion 122 in the horizontal direction. The second port 78b to which the second pipe 86 is connected is provided to the protruding portion 124.

The drain hole 96 to which the drain pipe 98 is connected is provided in the floor surface of the lower case 94M, facing below the filter 80.

The space within the filter case 78M is divided in the vertical direction by the filter 80, resulting in a first chamber 79a and a second chamber 79b. The filter 80 is arranged in the top portion of the lower case 94M. Examples of the filter 80 include a spongey porous material, nonwoven fabric, and the like. The filter 80 should have a structure that passes gas (hydrogen gas or the like) but does not pass liquid (water or the like).

In the manner described above, the curved exhaust flow path 82 formed by a flow path curved at a plurality of locations is provided within the filter case 78M. Specifically, the curved exhaust flow path 82 is formed in a manner to curve a plurality of times when travelling from the second port 78b (outside atmosphere side) to the first port 78a (stack case 14 side) (see imaginary lines of arrow F). In FIG. 4, the flow path curves at four locations, which are the curved portions P1 to P4, between the second port 78b and the first port 78a. The flow path curves at a right angle at each of the curved portions P1 to P4. The exhaust gas (air including a small amount of hydrogen gas having leaked from within the stack case 14) is introduced into the upper case 92M from the first pipe 84, passes downward through the filter 80 to enter into the lower case 94M, and flows to the second pipe 86. Unlike in the configuration described above, the first pipe 84 may be connected to the lower case 94M, the second pipe 86 may be connected to the upper case 92M, and the air including hydrogen may pass upward through the filter 80.

The curve angle at each curved portion P1 to P4 (or at least at one of the curved portions) is not limited to a right angle (90°), and may be an angle that is less than 90° or an angle that is greater than 90°. The curve angle at each curved portion P1 to P4 (or at least at one of the curved portions) may be 180°. The number of curves in the curved exhaust flow path 82 should be greater than or equal to two.

The filter 80 is arranged in the curved exhaust flow path 82. In other words, the filter 80 is arranged at any location between the curved portions (the curved portions P1 and P4 in FIG. 4) positioned at the respective ends of the curved exhaust flow path 82. Instead, the filter 80 may be arranged outside of the curved exhaust flow path 82, within the filter case 78M.

The following describes the operation of the fuel cell vehicle 10 configured in this manner.

When the fuel cell vehicle 10 shown in FIG. 1 is being driven, fuel gas is supplied from the fuel gas supply manifold 70a to the fuel gas inlet communication hole 48a. On the other hand, the oxygen-containing gas is supplied from the oxygen-containing gas supply manifold 68a to the oxygen-containing gas inlet communication hole 46a.

As shown in FIG. 3, the fuel gas is introduced into the fuel gas flow path 64 of the second separator 36 from the fuel gas inlet communication hole 48a. This hydrogen gas is supplied along the anode electrode 44 that forms the membrane electrode assembly 32.

The oxygen-containing gas is introduced into the oxygen-containing gas flow path 62 of the first separator 34 from the oxygen-containing gas inlet communication hole 46a. The oxygen-containing gas is supplied along the cathode electrode 42 that forms the membrane electrode assembly 32.

Accordingly, with the membrane electrode assembly 32, the hydrogen gas supplied to the anode electrode 44 and the air supplied to the cathode electrode 42 are consumed in an electrochemical reaction within the electrode catalyst layer, thereby generating power.

The fuel gas is discharged to the fuel gas discharge manifold 70b from the fuel gas outlet communication hole 48b. The oxygen-containing gas is discharged to the oxygen-containing gas discharge manifold 68b from the oxygen-containing gas outlet communication hole 46b.

Furthermore, the coolant is supplied to the coolant inlet communication hole 60a from the coolant supply manifold, and is introduced into the coolant flow path 66 located between the first separator 34 and the second separator 36. The coolant cools the membrane electrode assembly 32, and then flows through the coolant outlet communication hole 60b to be discharged to the coolant discharge manifold.

In FIG. 1, if the fuel gas leaks into the stack case 14 from the fuel cell stack 12, the air including the fuel gas is discharged to the outside of the vehicle from the exhaust ports 90R and 90L, via the exhaust apparatus 74 (exhaust ducts 76R and 76L and filter cases 78R and 78L). At this time, the fuel gas passes through the filters 80 in the filter cases 78R and 78L. In the case of the filter case 78M shown in FIG. 4 as well, the fuel gas flows in a similar manner.

In this case, the exhaust apparatus 74 according to the present embodiment realizes the effects described below.

According to the exhaust apparatuses 74R and 74L, the curved exhaust flow path 82 (see FIG. 4 as well) in which the flow path curves at a plurality of locations is provided in the filter cases 78R and 78L provided to the exhaust ducts 76R and 76L. Therefore, even if water or foreign matter flows in from the exhaust ports 90R and 90L, the flow of the water or foreign matter to the stack case 14 side is restricted by the curved exhaust flow path 82 within the filter cases 78R and 78L. Due to this, compared to a case where just the filter 80 is provided to the exhaust ducts 76R and 76L, it is possible to effectively prevent water and foreign matter from entering in the stack case 14.

For example, even in a case where water has flowed into the filter cases 78R and 78L from the exhaust ports 90R and 90L via the second pipes 86 and 102 of the exhaust ducts 76R and 76L, this water is prevented from moving to the first port 78a side (stack case 14 side) by the filter 80. In this case, the water is discharged to the outside of the vehicle from the drain pipes 98 and 112 connected to the floor portions of the filter cases 78R and 78L. Furthermore, even in a case where solid foreign matter has entered into the filter cases 78R and 78L from the exhaust ports 90R and 90L via the second pipes 86 and 102 of the exhaust ducts 76R and 76L, this foreign matter is prevented from moving to the first port 78a side (stack case 14 side) by the filter 80. In a case where the filter case 78M shown in FIG. 4 is used in the exhaust apparatus 74 as well, the same effect as described above can be realized.

The present invention is not limited to the embodiments described above, and various alterations can be made without deviating from the technical scope of the present invention.

What is claimed is:

1. An exhaust apparatus for discharging exhaust gas from a stack case housing a fuel cell stack formed by stacking a plurality of power generating cells, the exhaust apparatus comprising:
an exhaust duct in communication with an exhaust port of a vehicle and the stack case; and
a filter case provided to the exhaust duct and housing a filter, wherein
a curved exhaust flow path in which a flow path curves at a plurality of locations is provided in the filter case, wherein
the filter case includes an upper case and a lower case that is bonded to the upper case,
the filter is attached to between the upper case and the lower case, and
one of the upper case and the lower case includes an inlet for exhaust gas and the other of the upper case and the lower case includes an outlet for exhaust gas.

2. The exhaust apparatus according to claim 1, wherein the filter case has a shape extending in a horizontal direction, and
the inlet and the outlet are provided on one end side of the filter case in a longitudinal direction.

3. The exhaust apparatus according to claim 1, wherein the exhaust duct includes a first pipe connected to the stack case and the inlet of the filter case, and a second pipe connected to the outlet of the filter case, and the first pipe or the second pipe is connected in an inclined manner to the filter case.

4. The exhaust apparatus according to claim 1, wherein a drain pipe extending downward is connected to a floor portion of the lower case.

5. The exhaust apparatus according to claim 4, wherein a drain hole to which the drain pipe is connected is provided in a floor surface of the lower case, facing below the filter.

6. The exhaust apparatus according to claim 1, wherein the filter case includes an inlet and an outlet for exhaust gas,
the exhaust duct includes a first pipe connected to the stack case and the inlet of the filter case, and a second pipe connected to the outlet of the filter case,
the first pipe is connected to the upper case, and
the second pipe is connected to the lower case.

7. The exhaust apparatus according to claim 1, wherein a space within the filter case is divided in a vertical direction by the filter, thereby forming a first chamber and a second chamber.

8. The exhaust apparatus according to claim 1, wherein the fuel cell stack is an automotive fuel cell stack, and the exhaust apparatus is arranged at both sides of the stack case in a vehicle width direction.

* * * * *